(12) United States Patent
Tang et al.

(10) Patent No.: US 9,077,452 B2
(45) Date of Patent: Jul. 7, 2015

(54) QSFP+ TO SFP+ FORM-FACTOR ADAPTER WITH SIGNAL CONDITIONING

(71) Applicant: Cisco Technology, Inc., San Jose, CA (US)

(72) Inventors: Norman Tang, Los Altos, CA (US); Liang Ping Peng, Santa Clara, CA (US); David Lai, Mountain View, CA (US); Anthony Nguyen, San Jose, CA (US); Steven A. Hanssen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 13/781,892

(22) Filed: Mar. 1, 2013

(65) Prior Publication Data
US 2014/0248059 A1 Sep. 4, 2014

(51) Int. Cl.
*H04B 10/40* (2013.01)
*H04L 12/931* (2013.01)

(52) U.S. Cl.
CPC .............. *H04B 10/40* (2013.01); *H04L 49/352* (2013.01)

(58) Field of Classification Search
None
See application file for complete search history.

(56) References Cited

U.S. PATENT DOCUMENTS

| 7,335,033 | B1 * | 2/2008 | Edwards et al. ............. 439/76.1 |
| 8,611,830 | B2 * | 12/2013 | Au et al. ...................... 455/74.1 |
| 2010/0274876 | A1 | 10/2010 | Kagan et al. |
| 2011/0081807 | A1 * | 4/2011 | Rephaeli et al. ......... 439/620.21 |
| 2011/0255574 | A1 | 10/2011 | Carter et al. |
| 2011/0299858 | A1 | 12/2011 | Mazzini et al. |
| 2012/0051735 | A1 | 3/2012 | Achkir et al. |
| 2012/0071011 | A1 | 3/2012 | Kagan et al. |
| 2012/0233368 | A1 * | 9/2012 | Alshinnawi et al. .......... 710/301 |
| 2013/0272348 | A1 * | 10/2013 | Lai et al. ...................... 375/219 |

\* cited by examiner

*Primary Examiner* — Anh-Vu Ly
(74) *Attorney, Agent, or Firm* — Edell, Shapiro & Finnan, LLC

(57) ABSTRACT

Techniques are provided for sending and receiving data communications between an enhanced Quad Small Form-Factor Pluggable (QSFP+) transceiver module and an enhanced Small Form-Factor Pluggable (SFP+) transceiver module. An adapter device is provided that has a first set of signal pins configured to interface with an SFP+ transceiver module and a second set of signal pins is provided that is configured to interface with a QSFP+ host port. A retimer unit is also provided that is configured to modify a 10G signal of a first electrical signal standard associated with the SFP+ transceiver module to a 10G signal of a second electrical standard associated with a QSFP+ transceiver module and to enhance a 10G signal of the second electrical signal standard to a 10G signal of the first electrical signal standard.

16 Claims, 4 Drawing Sheets

US 9,077,452 B2

QSFP+ TO SFP+ FORM-FACTOR ADAPTER WITH SIGNAL CONDITIONING

TECHNICAL FIELD

The present disclosure relates to enabling data transmissions between an enhanced Quad Small Form-Factor Pluggable (QSFP+) transceiver module and an enhanced Small Form-Factor Pluggable (SFP+) transceiver module.

BACKGROUND

Multiple Source Agreement (MSA) specifications for an enhanced Quad Small Form-Factor Pluggable (QSFP+) transceiver define a hot-pluggable module that integrates four transmit and four receive channels with a standard multi-fiber push-on (MPO) parallel optical connector for high-density applications. Due to power and thermal challenges of present technology, however, the QSFP+ module can transmit data across only short distances. As such, the QSFP+ transceiver module is limited to short reach data center applications. SFP+ transceiver modules, on the other hand, are able to transmit data across distances larger than those enabled by QSFP+ transceiver modules, albeit at reduced data rates.

DESCRIPTION OF EXAMPLE EMBODIMENTS

Overview

Techniques are provided to enable one or more enhanced Small Form-Factor Pluggable (SFP+) form factor transceiver modules to be used inside of an enhanced Quad Small Form-Factor Pluggable (QSFP+) host port. These techniques may be described as an apparatus, method or computer readable process logic. The adapter device has a first set of signal pins configured to interface with an SFP+ transceiver module capable of sending and receiving signals at a data rate of ten gigabits per second (10G). A second set of signal pins is provided that is configured to interface with a QSFP+ host port. A retimer unit is also provided that is configured to enhance a 10G signal of a first electrical signal standard associated with the SFP+ transceiver module to a 10G signal of a second electrical standard associated with a QSFP+ transceiver module configured and to modify a 10G signal of the second electrical signal to a 10G signal of the first electrical standard send and receive signals at a data rate of forty gigabits per second (4×10G signals) and to enhance a 10G signal of the second electrical signal standard to a 10G signal of the first electrical signal standard.

Example Embodiments

Figure 1:
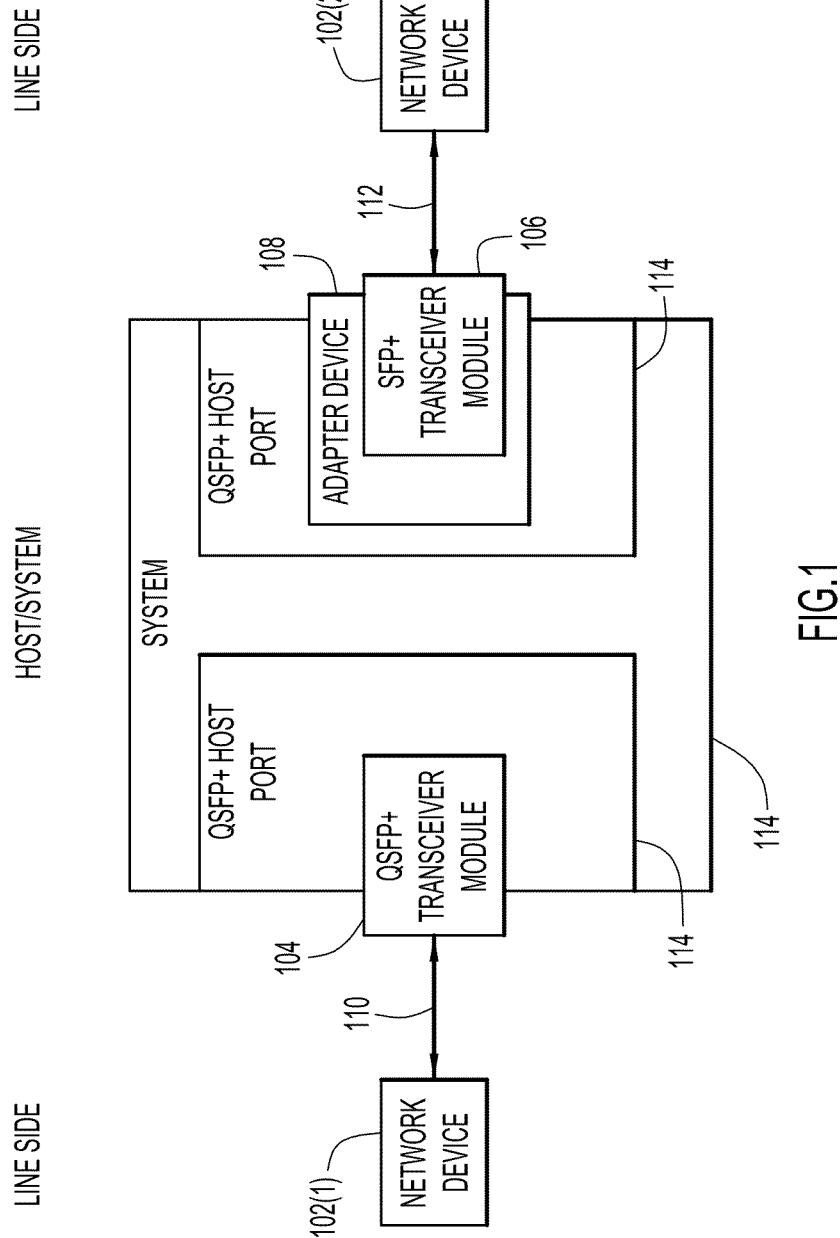
FIG. 1 shows an example topology depicting an enhanced Quad Small Form-Factor Pluggable (QSFP+) transceiver module, an enhanced Small Form-Factor Pluggable (SFP+) transceiver module and an adapter device that is configured to plug into the QSFP+ host port and that allows the SFP+ transceiver module to be used in the QSFP+ port.

The techniques described herein are directed to enabling data transmissions between an enhanced Quad Small Form-Factor Pluggable (QSFP+) host port and an enhanced Small Form-Factor Pluggable (SFP+) transceiver module. An example network topology 100 ("network") is illustrated in FIG. 1. In FIG. 1, the network 100 has a plurality of network devices, shown at reference numerals 102(1) and 102(2). The network 100 also has a QSFP+ transceiver module, shown at reference numeral 104, and an SFP+ transceiver module, shown at reference numeral 106. In the network 100, an adapter device operates as an interface between the QSFP+ host port 114 and the SFP+ transceiver module 106. The adapter device is shown at reference numeral 108 and is configured to enable data transmissions between the QSFP+ host port 114 and the SFP+ transceiver module 106, as described by the techniques herein.

The network device 102(1) is configured to interface with (or "plug into") the QSFP+ transceiver module 104. For example, the network device 102(1) may be located remotely from the QSFP+ transceiver module 104, and may interface with the QSFP+ transceiver module 104 via, e.g., a fiber or copper cable. Likewise, the network device 102(2) is configured to interface with the SFP+ transceiver module 106. The network device 102(2) may also be located remotely from the SFP+ transceiver module 106 and may interface with the SFP+ transceiver module 106 via, e.g., a fiber or copper cable.

As shown in FIG. 1, the adapter device 108 is configured to interface with the SFP+ transceiver module 106. Thus, in an operational configuration of the network 100, where all of the components of the network 100 in FIG. 1 are plugged into the appropriate other components, the network device 102(1) is configured to exchange communications with the network device 102(2) via the QSFP+ transceiver module 104, adapter device 108 and the SFP+ transceiver module 106. In particular, the SFP+ transceiver module 106 is configured to plug into the QSFP+ host port 114 via the adapter device 108. These communications are also known as "QSFP+ to SFP+" communications. Likewise, in the operational mode of the network 100, the network device 102(2) is configured to exchange communications with the network device 102(1) via the SFP+ transceiver module 106, the adapter device 108 and the QSFP+ transceiver module 104. These communications are known as "SFP+ to QSFP+" communications.

It is appreciated that the QSFP+ transceiver module 104 is a QSFP+ transceiver module, as defined by multiple source agreement (MSA) standards and the Institute of Electrical and Electronic Engineers (IEEE) standards. Likewise, the SFP+ transceiver module 106 is an SFP+ transceiver module, as defined by the MSA standards and the IEEE standards. For simplicity, the terms QSFP+ transceiver module and SFP+ transceiver module are used hereinafter.

As stated above, for QSFP+ to SFP+ communications, the network device 102(1) (e.g., "first host network device") is configured to exchange data communications with the QSFP+ transceiver module 104, as shown by arrow 110. These data communications may be, for example, data communications in compliance with the ten gigabit Ethernet standard (hereinafter "10G," "10G data" or "10G data communications"). Likewise, for SFP+ to QSFP+ communications, the network device 102(2) (e.g., "second system network device") is configured to exchange data communications with the SFP+ transceiver module 106, as shown by arrow 112. These data communications may also be, for example, 10G data communications.

The network 100 shows the QSFP+ transceiver module 104 and the adapter device 108 residing in QSFP+ host ports 114. That is, the QSFP+ transceiver module 104 plugs into a QSFP+ host port 114 and the adapter device 108 plugs into another QSFP+ host port 114. The SFP+ transceiver module 106 plugs into the adapter device 108, which essentially allows the SFP+ transceiver module 106 to plug into a QSFP+ host port 114 via the adapter device 108. It should be appreciated that the QSFP+ transceiver module 104 may have multiple ports. FIG. 1 also shows a system 114 which may comprise, e.g., the QSFP+ transceiver module 104, the SFP+ transceiver module 108, the adapter device 108 and the plurality of QSFP+ host ports 114.

Figure 2:
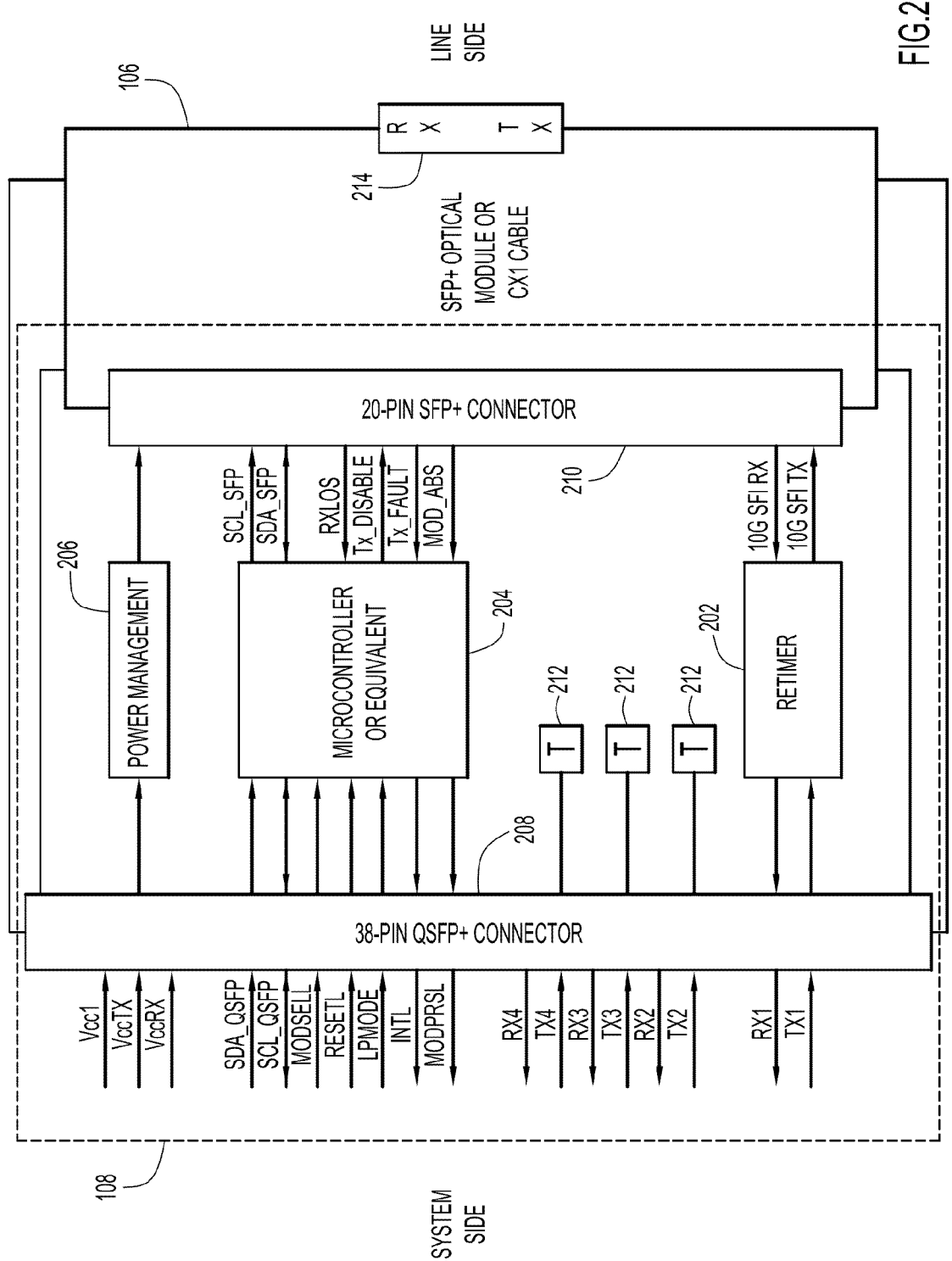
FIG. 2 shows an example block diagram showing components of the adapter device.

Reference is now made to FIG. 2, which shows an example block diagram of components of the adapter device 108. It should be appreciated that the adapter device 108 may be referred to hereinafter as a "QSFP+ to SFP+ adapter device" or an "SFP+ to QSFP+ adapter device." The adapter device 108 comprises several components, including, a retimer unit 202, a microcontroller unit 204, a power management unit 206, a set of QSFP+ signal pins 208 and a set of SFP+ signal pins 210. The adapter device 108 also comprises a plurality of terminating block units 212 in order to terminate signal exchanges, as described by the techniques hereinafter.

In FIG. 2, the set of QSFP+ signal pins 208 (also referred to hereinafter as "system signal pins") are configured to interface with the QSFP+ transceiver module 104. The set of SFP+ signal pins 210 (also referred to hereinafter as "host signal pins") are configured to interface with the SFP+ transceiver module 106. In FIG. 2, the SFP+ transceiver module 106 (with SFP+ port 214) is shown interfaced with the SFP+ signal pins 210. The QSFP+ transceiver module 104 is not shown.

The set of QSFP+ signal pins 208 comprises four sets of signal pin pairs. Each set of signal pins pair includes one differential transmit (TX) pin pair and one differential receive (RX) pin pair. In one example, only one set of pins is used for sending and receiving 10G data signals for SFP+ transceiver module. Thus, when the set of QSFP+ signal pins 208 interfaces with the QSFP+ transceiver module, the one signal pin pair interfaces with corresponding QSFP+ ports that are configured to send and receive 10G data. The other three signal pin pairs are terminated on the adapter. The QSFP+ transceiver module 104, in general, is capable of sending a total of 40G data via the four 10G data paths (e.g., 4×10G data signals). Presently, the 40G QSFP+ transceiver module 104 is limited to so-called "short-reach" data applications for data transmissions to distances of up to 100 meters. The SFP+ transceiver module 106, on the other hand, is able to send and receive data communications across larger distances (e.g., up to 10 kilometers for long reach (LR) communications, 10 kilometers for extended reach (ER) communications and 80 kilometers for distances beyond the ER capabilities (e.g., ZR/Dense Wavelength Division Multiplexing (DWDM))). Thus, though the SFP+ transceiver module 106 is able to send and receive 10G communications only, it can do so at distances greater than the 40G communications capable of being exchanged by the QSFP+ transceiver module 104. Thus, the techniques described herein enable the SFP+ transceiver module 106 to interface with a QSFP+ host port 114 via the adapter device 108 in order to leverage the long reach capabilities of the SFP+ transceiver module 106 for communications sent to and from the QSFP+ transceiver module 104.

In order to accomplish these goals, the adapter device 108 is configured to convert signal communications received from the QSFP+ transceiver module 104 into an electrical signal standard that is able to be processed by the SFP+ transceiver module 106. Likewise, the adapter device 108 is configured to convert signal communications received from the SFP+ transceiver module into an electrical signal standard that is able to be processed by the QSFP+ transceiver module 104.

For example, when the adapter device 108 plugs into a QSFP+ host port 114 via the QSFP+ signal pins 208 and when the SFP+ transceiver module 106 plugs into the adapter device 108 via the SFP+ signal pins 210, signals (e.g., signals representing 10G communications originating from the QSFP+ port 114) from the QSFP+ port 114 destined for the SFP+ transceiver module 106 pass through the retimer unit 202. The retimer unit 202 receives the signals in a first electrical signal standard (also referred to hereinafter as a "system electrical signal standard") associated with the QSFP+ port 114 from which the signals originated from any other 10G port in the system, e.g., from QSFP+ transceiver module 104. For example, the first electrical signal standard associated with the QSFP+ port 114 may be a Parallel Physical Interface (nPPI) standard of the QSFP+ as defined by known IEEE standards. Upon receiving the signals in the first electrical signal standard, the retimer unit 202 is configured to modify the signals in order to convert the signals to a second electrical signal standard (also referred to hereinafter as a "host electrical signal standard") that is associated with the SFP+ transceiver module 106. For example, the second electrical signal standard may be a SFI interface (e.g., a high-speed electrical interface between host and SFP+ module) of the SFP+ transceiver module 106 as defined by known standards (e.g., SFF-8431).

Likewise, when the adapter device 108 plugs into the QSFP+ host port 114 via the QSFP+ signal pins 208 and when the SFP+ transceiver module 106 plugs into adapter device 108 via the SFP+ signal pins 210, signals originating from the SFP+ transceiver module 106 destined for the SFP+ transceiver module 104 pass through the retimer unit 202. The retimer unit 202 receives the signals in the host electrical signal standard (e.g., the SFI standard) of the SFP+ transceiver module 106 and converts the signals to the system electrical signal standard (e.g., the nPPI standard) of the QSFP+ transceiver module 104.

The retimer unit 202 may convert signals between the signal standards associated with the QSFP+ transceiver module 104 and the SFP+ transceiver module 104 by retiming or recovering an incoming signal transmission (e.g., via a clock data recovery unit). For example, the retimer unit 202 with integrated signal conditioning locks the 10G data rate and includes a fully adaptive equalizer, Clock and Data Recovery (CDR) and transmit De-Emphasis (DE) driver to enable data transmissions over long, lossy and crosstalk-impaired high speed serial links. Thus, the retimer unit 202 of the adapter device 108 enables 10G QSFP+ to SFP+ communications to be sent from the QSFP+ host port 114 to the SFP+ transceiver module 106, and ultimately between the network devices 102(1) and 102(2), across distances greater than those that would otherwise be enabled with transmissions initiated by the QSFP+ module alone (e.g., "long reach distances"). Likewise, the retimer unit 202 of the adapter device 108 enables 10G SFP+ to QSFP+ communications to be sent from the SFP+ transceiver module 106 to the QSFP+ transceiver module 104, and ultimately between the network devices 102(1) and 102(2), across the long reach distances.

When the adapter device 108 is plugged into the QSFP+ host port 114 with the SFP+ transceiver module 106, the microcontroller unit 204 of the adapter device 108 is configured to receive management signals of one transceiver device and to convert the management signals to a format that is able to be processed by the other transceiver device. For example, for QSFP+ to SFP+ communications, the microcontroller unit 204 receives from the QSFP+ port 114, management signals of a first management signal standard along a first management signal path (also referred to hereinafter as a "system management signal path"). The first management signal standard is one that is associated with the QSFP+ port 114, and upon receiving the management signals that target for SFP+, the microcontroller unit 204 converts the management signals to a second management signal standard that is associated with the SFP+ transceiver module 106 and sends the converted management signals to the SFP+ transceiver module 106 via a second management signal path. Likewise, for SFP+ to QSFP+ communications, the microcontroller unit 204 receives from the SFP+ transceiver module 106, management signals of the management signal standard associated with the SFP+ transceiver module 106 and converts these management signals to a management signal standard associated with the QSFP+. It should be appreciated that all of the management signals are not converted. For example, management signals for the adapter device 108 itself are not converted to a different signal standard.

As stated above, FIG. 2 also shows a power management unit 206. The power management unit 206 is configured to deliver power from the QSFP+ host port 114 to the adapter device 108 and SFP+ transceiver module 106. This power delivery ensures that the adapter device 108 and SFP+ transceiver module 106 receives enough power to be operational upon being plugged into the QSFP+ host port 114 (via the adapter device 108). The power management unit 206 converts power from a power signal path of the QSFP+ signal pins 208 (originating from the QSFP+ host port 114) to a power signal path of the SFP+ signal pins 210 (destined for the SFP+ transceiver module 106).

FIG. 2 also shows the terminating block units 212. The terminating block units 212 are configured to terminate any data signal transmissions that are not being used by the adapter device 108. In other words, the adapter device 108 enables an SFP+ transceiver module 106 to interface with a QSFP+ transceiver module 104 in order to enable the QSFP+ transceiver module 104 to send and receive 10G signals across distances greater than those ordinarily achievable by the QSFP+ transceiver module alone. Since the QSFP+ transceiver module 104 is configured to send four 10G data signals, and since the SFP+ transceiver module 106 is able to send only 10G data signals, the adapter device 108 is effective for 10G signals sent from the QSFP+ host port 114 only along a single one of the four 10G data signal paths. Thus, the terminating block units 212 terminate any signals that are sent by the QSFP+ host port 114 along the other data signal paths.

Though not shown, it should be appreciated that the adapter device 108 may also comprise a processor. The processor may be embodied by digital logic gates in a fixed or programmable digital logic integrated circuit, which digital logic gates are configured to perform the techniques described herein. For example, the signal modification techniques performed by the retimer unit 202 may be stored in a memory component of the adapter device 108 that comprises read only memory (ROM), random access memory (RAM), magnetic disk storage media devices, optical storage media devices, flash memory devices, electrical, optical, or other physical/tangible (non-transitory) memory storage devices. Thus, the signal modification techniques may be stored in one or more computer readable storage media comprising computer or processor executable instructions operable to perform the signal modification techniques, as described.

The retimer unit 202 comprises, among other components, an equalizer unit, retimer circuitry, a clock data recovery (CDR) unit and a buffer unit. The CDR unit, for example, is configured to retime signals in order to convert the signals from the electrical signal standard associated with the QSFP+ transceiver module 104 to the electrical signal standard associated with the SFP+ transceiver module 106 (and vice versa, as the case may be), as described by the techniques above.

Figure 3:
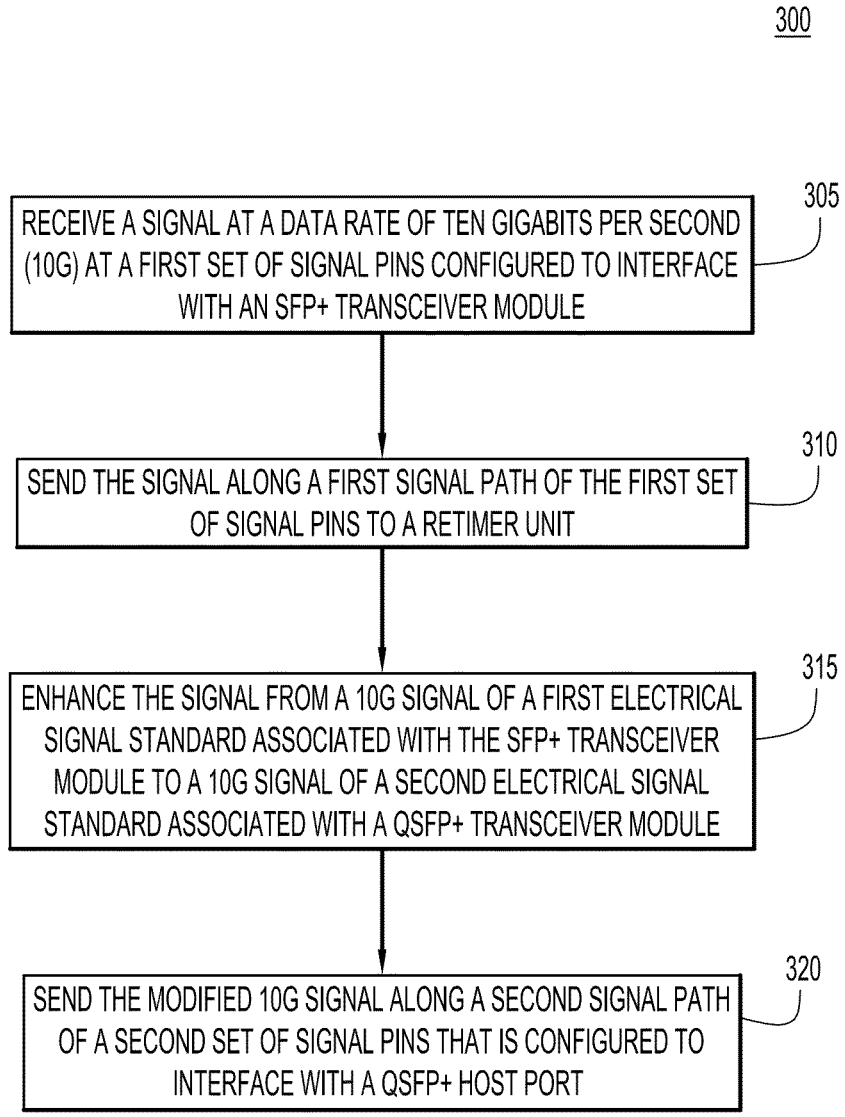
FIG. 3 shows an example flow chart depicting operations enabling 10G communications from the SFP+ transceiver module to the QSFP+ transceiver module.

Reference is now made to FIG. 3, which shows an example flow chart 300 that depicts operations for enabling SFP+ to QSFP+ 10G communications between the SFP+ transceiver module 106 and the QSFP+ transceiver module 104. At operation 305, a signal is received at a data rate of ten gigabits per second (10G) at a first set of signal pins configured to interface with an SFP+ transceiver module. At operation 310, the signal is sent along a first signal path of the first set of signal pins to a retimer unit. The signal is modified (e.g., enhanced), at operation 315, from a 10G signal of a first electrical signal standard associated with the SFP+ transceiver module to a 10G signal of a second electrical signal standard associated with a QSFP+ transceiver module. At operation 320, the modified 10G signal is sent along a second signal path of a second set of signal pins that is configured to interface with the QSFP+ transceiver module.

Figure 4:
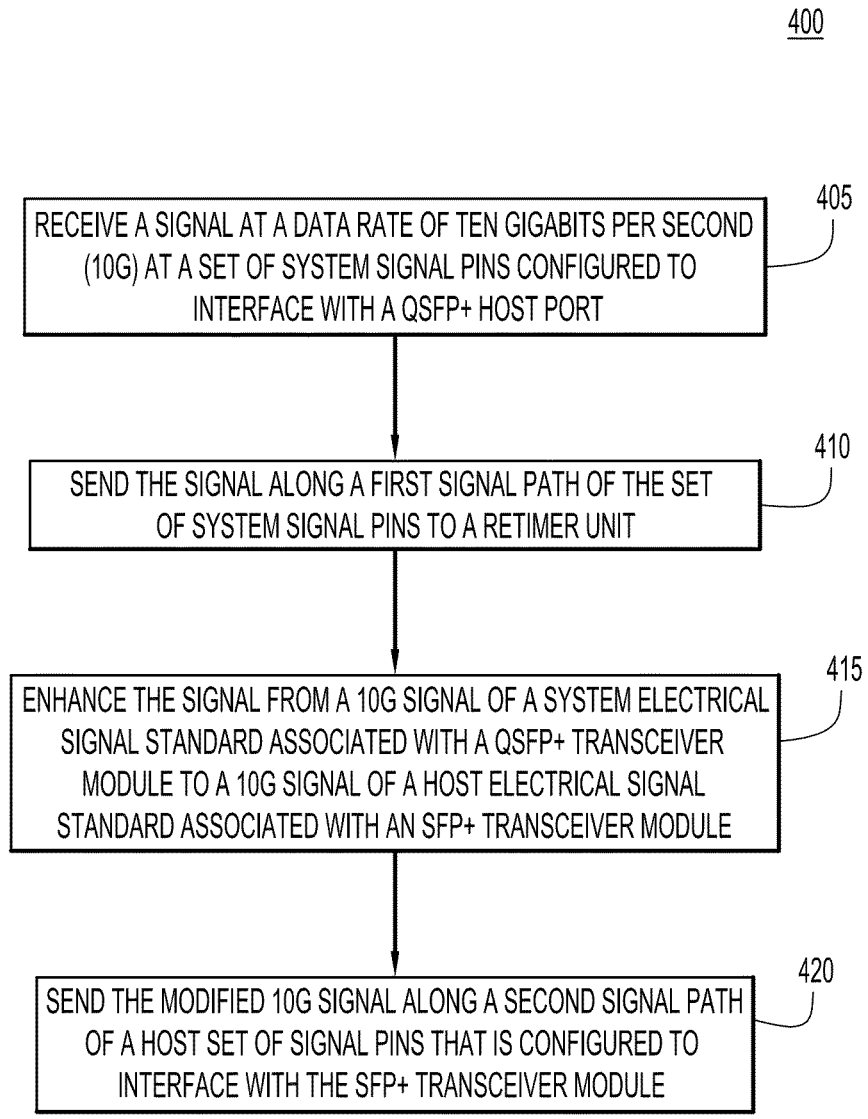
FIG. 4 shows an example flow chart depicting operations for enabling 10G communications from the QSFP+ transceiver module to the SFP+ transceiver module.

Reference is now made to FIG. 4, which shows an example flow chart 400 that depicts operations for enabling QSFP+ to SFP+ 10G communications between the QSFP+ transceiver module 104 and the SFP+ transceiver module 106. At operation 405, a signal is received at a data rate of ten gigabits per second (10G) at a set of system signal pins configured to interface with a QSFP+ transceiver module. The signal is sent, at operation 410, along a first signal path of the set of signal pins to a retimer unit. At operation 415, the signal is modified (e.g., enhanced) from a 10G signal of a system electrical signal standard associated with the QSFP+ transceiver module to a 10G signal of a host electrical signal standard associated with an SFP+ transceiver module. At operation 420, the modified 10G signal is sent along a second signal path of a host set of signal pins that is configured to interface with the SFP+ transceiver module.

It is appreciated that the techniques described above in connection with all embodiments may be performed by one or more computer readable storage media that is encoded with software comprising computer executable instructions to perform the methods and steps described herein. For example, the operations performed by the adapter device 108 may be performed by one or more computer or machine readable storage media or device executed by a processor and comprising software, hardware or a combination of software and hardware to perform the techniques described herein.

In sum, an apparatus is provided comprising: a first set of signal pins configured to interface with an enhanced Small Form-Factor Pluggable (SFP+) transceiver module capable of sending and receiving signals at a data rate of ten gigabits per second (10G); a second set of signal pins configured to interface with an enhanced Quad SFP+ (QSFP+) host port capable of sending and receiving signals at a data rate of forty gigabits per second (40G) from a QSFP+ transceiver module; and a retimer unit that is configured to enhance a 10G signal of a first electrical signal standard associated with the SFP+ transceiver module to a 10G signal of a second electrical signal standard associated with the QSFP+ transceiver module and to modify a 10G signal of the second electrical signal standard to a 10G signal of the first electrical signal standard.

In addition, a method is provided comprising: at a adapter apparatus, receiving a signal at a data rate of ten gigabits per second (10G) at a first set of signal pins configured to interface with an enhanced Small Form-Factor Pluggable (SFP+) transceiver module; sending the signal along a first signal path of the first set of signal pins to a retimer unit; enhancing the signal from a 10G signal of a first electrical signal standard associated with the SFP+ transceiver module to a 10G signal of a second electrical signal standard associated with a Quad SFP+ (QSFP+) transceiver module; and sending the modified 10G signal along a second signal path of a second set of signal pins that is configured to interface with a QSFP+ host port.

Furthermore, a method is provided comprising: at an adapter apparatus, receiving a signal at a data rate of ten gigabits per second (10G) at a set of system signal pins configured to interface with an enhanced Quad Small Form-Factor Pluggable (QSFP+) host port; sending the signal along a first signal path of the set of system signal pins to a retimer unit; enhancing the signal from a 10G signal of a system electrical signal standard associated with a QSFP+ transceiver module to a 10G signal of a host electrical signal standard associated with an SFP+ transceiver module; and sending the modified 10G signal along a second signal path of a host set of signal pins that is configured to interface with the SFP+ transceiver module.

Additionally, one or more computer readable storage media is provided that is encoded with software comprising computer executable instructions and when the software is executed operable to: receive a signal at a data rate of ten gigabits per second (10G) at a first set of signal pins configured to interface with an enhance Small Form-Factor Pluggable (SFP+) transceiver module; send the signal along a first signal path of the first set of signal pins to a retimer unit; enhance the signal from a 10G signal of a first electrical signal standard associated with the SFP+ transceiver module to a 10G signal of a second electrical signal standard associated with a Quad SFP+ (QSFP+) transceiver module; and send the modified 10G signal along a second signal path of a second set of signal pins that is configured to interface with a QSFP+ host port.

The above description is intended by way of example only. Various modifications and structural changes may be made therein without departing from the scope of the concepts described herein and within the scope and range of equivalents of the claims.

What is claimed is:

1. An apparatus comprising:
   a first set of signal pins configured to plug into an enhanced Small Form-Factor Pluggable (SFP+) transceiver module capable of sending and receiving signals at a data rate of ten gigabits per second (10G);
   a second set of signal pins configured to plug into an enhanced Quad SFP+ (QSFP+) host port capable of sending and receiving signals at a data rate of forty gigabits per second (40G) from a QSFP+ transceiver module;
   a retimer unit that is configured to modify a 10G signal of a first electrical signal standard associated with the SFP+ transceiver module to a 10G signal of a second electrical signal standard associated with the QSFP+ transceiver module and to modify a 10G signal of the second electrical signal standard to a 10G signal of the first electrical signal standard, wherein the second set of signal pins comprises four signal path pairs and the retimer unit is configured to interface with one of the four signal path pairs;
   a plurality of terminator units configured to terminate signal transmission along the signal path pairs that are not interfaced with the retimer unit; and
   a microcontroller manager configured to modify management signals of a first management signal standard associated with the SFP+ transceiver module to management signals of a second management signal standard associated with the QSFP+ transceiver module.

2. The apparatus of claim 1, wherein the retimer unit is configured to modify the 10G signal of the first electrical signal standard in accordance with a SFI interface of the SFP+ transceiver module to the 10G signal of the second electrical standard in accordance with a Parallel Physical Interface (nPPI) standard of the QSFP+ transceiver module.

3. The apparatus of claim 1, further comprising a power management unit that is configured to deliver power from a power signal path from the second set of electrical pins to a power signal path of the first set of electrical pins destined for the SFP+ transceiver module.

4. The apparatus of claim 1, wherein the retimer unit is configured to modify the 10G signal of the first electrical signal standard to the 10G signal of the second electrical signal standard such that the QSFP+ host port is capable of sending and receiving messages to and from the SFP+ transceiver module.

5. A method comprising:
   at an adapter apparatus, receiving a signal at a data rate of ten gigabits per second (10G) at a first set of signal pins configured to plug into an enhanced Small Form-Factor Pluggable (SFP+) transceiver module;
   receiving a management signal at the first set of signal pins;
   sending the signal along a first signal path of the first set of signal pins to a retimer unit;
   sending the management signal to a microcontroller unit along a first management signal path;
   enhancing the signal from a 10G signal of a first electrical signal standard associated with the SFP+ transceiver module to a 10G signal of a second electrical signal standard associated with a Quad SFP+ (QSFP+) transceiver module;
   enhancing the management signal of a first management signal standard associated with the SFP+ transceiver module to a management signal of a second management signal standard associated with the QSFP+ transceiver module;
   sending the enhanced 10G signal along a second signal path of a second set of signal pins that is configured to plug into a QSFP+ host port, wherein the second set of signal pins comprises four signal path pairs such that the enhanced 10G signal is received along one of the signal path pairs and remaining ones of the signal path pairs are terminated; and
   sending the enhanced management signal along a second management signal path to the second set of signal pins.

6. The method of claim 5, wherein enhancing the 10G signal comprises modifying the 10G signal of the first electrical standard in accordance with a SFI interface standard of the SFP+ transceiver module to the 10G signal standard of the second electrical standard in accordance with a Parallel Physical Interface (nPPI) standard of the QSFP+ transceiver module.

7. The method of claim 5, further comprising delivering power from a power signal path from the second set of electrical pins to a power signal path of the first set of electrical pins destined for the SFP+ transceiver module.

8. The method of claim 5, wherein enhancing the 10G signal comprises modifying the 10G signal of the first electrical signal standard to the 10G signal of the second electrical signal standard such that the QSFP+ host port is capable of sending and receiving messages to and from the SFP+ transceiver module.

9. A method comprising:
   at an adapter apparatus, receiving a signal at a data rate of ten gigabits per second (10G) at a set of system signal pins configured to plug into an enhanced Quad Small Form-Factor Pluggable (QSFP+) host port, wherein the set of system signal pins comprises four signal path pairs such that the signal is receive along one of the signal path pairs and remaining ones of the signal path pairs are terminated;
   receiving a management signal at the set of system signal pins;
   sending the signal along a first signal path of the set of system signal pins to a retimer unit;
   sending the management signal to a microcontroller unit along a first management signal path;
   enhancing the signal from a 10G signal of a system electrical signal standard associated with a QSFP+ transceiver module to a 10G signal of a host electrical signal standard associated with an SFP+ transceiver module;
   enhancing the management signal of a management signal standard associated with the QSFP+ transceiver module to a management signal of a management signal standard associated with the SFP+ transceiver module;
   sending the enhanced 10G signal along a second signal path of a host set of signal pins that is configured to interface with the SFP+ transceiver module; and
   sending the enhanced management signal along a second management signal path to the host set of signal pins.

10. The method of claim 9, wherein enhancing the 10G signal comprises modifying the 10G signal of the system electrical standard in accordance with a Parallel Physical Interface (nPPI) standard of the QSFP+ transceiver module to the 10G signal standard of the host electrical standard in accordance with a SFI interface standard of the SFP+ transceiver module.

11. The method of claim 9, wherein enhancing the 10G signal comprises modifying the 10G signal of the system electrical signal standard to the 10G signal of the host electrical signal standard such that the QSFP+ host port is capable of sending and receiving messages to and from the SFP+ transceiver module.

12. One or more non-transitory computer readable storage media encoded with software comprising computer executable instructions and when the software is executed operable to:
   receive a signal at a data rate of ten gigabits per second (10G) at a first set of signal pins configured to plug into an enhance Small Form-Factor Pluggable (SFP+) transceiver module;
   receive a management signal at the first set of signal pins;
   send the signal along a first signal path of the first set of signal pins to a retimer unit;
   send the management signal to a microcontroller unit along a first management signal path;
   enhance the signal from a 10G signal of a first electrical signal standard associated with the SFP+ transceiver module to a 10G signal of a second electrical signal standard associated with a Quad SFP+ (QSFP+) transceiver module;
   enhance the management signal of a first management signal standard associated with the SFP+ transceiver module to a management signal of a second management signal standard associated with the QSFP+ transceiver module;
   send the enhanced 10G signal along a second signal path of a second set of signal pins that is configured to plug into a QSFP+ host port, wherein the second set of signal pins comprises four signal path pairs such that the enhanced 10G signal is receive along one of the signal path pairs and remaining ones of the signal path pairs are terminated; and
   send the modified management signal along a second management signal path to the second set of signal pins.

13. The non-transitory computer readable storage media of claim 12, wherein the instructions operable to enhance comprise instructions operable to modify the 10G signal of the first electrical standard in accordance with a SFI interface standard of the SFP+ transceiver module to the 10G signal standard of the second electrical standard in accordance with a Parallel Physical Interface (nPPI) standard of the QSFP+ transceiver module.

14. The non-transitory computer readable storage media of claim 12, further comprising instructions operable to deliver power from a power signal path from the second set of electrical pins to a power signal path of the first set of electrical pins destined for the SFP+ transceiver module.

15. The method of claim 9, further comprising delivering power from a power signal path from the set of system signal pins a power signal path of the host electrical pins destined for the SFP+ transceiver module.

16. The non-transitory computer readable storage media of claim 12, further comprising instructions operable to modify the 10G signal of the first electrical signal standard to the 10G signal of the second electrical signal standard such that the QSFP+ host port is capable of sending and receiving messages to and from the SFP+ transceiver module.

* * * * *